(12) United States Patent
Zhang et al.

(10) Patent No.: US 12,724,794 B2
(45) Date of Patent: Sep. 1, 2026

(54) DATA MANAGEMENT

(71) Applicant: INTERNATIONAL BUSINESS MACHINES CORPORATION, Armonk, NY (US)

(72) Inventors: Hong Mei Zhang, Beijing (CN); Sheng Yan Sun, Beijing (CN); Meng Wan, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 17/807,938

(22) Filed: Jun. 21, 2022

(65) Prior Publication Data

US 2023/0409602 A1 Dec. 21, 2023

(51) Int. Cl.
*G06F 16/27* (2019.01)

(52) U.S. Cl.
CPC .................................. *G06F 16/278* (2019.01)

(58) Field of Classification Search
CPC ..................................................... G06F 16/278
See application file for complete search history.

(56) References Cited

U.S. PATENT DOCUMENTS 6,321,238 B1 * 11/2001 Putzolu ................... G06F 16/27
11,232,000 B1 * 1/2022 Bhatia ................. G06F 11/1464
11,314,717 B1 * 4/2022 Certain ............... G06F 16/2308
11,573,981 B1 * 2/2023 Goyal .............. G06F 16/24568
11,762,853 B2 * 9/2023 Pang ................. G06F 16/24535 707/718
2001/0039550 A1 * 11/2001 Putzolu .................. G06F 16/27 707/999.009
2004/0117345 A1 * 6/2004 Bamford ................ G06F 16/27
2014/0082301 A1 * 3/2014 Barton ................ H04L 67/1097 711/153
2014/0325182 A1 * 10/2014 Varakur ............. G06F 11/0709 712/30

(Continued)

FOREIGN PATENT DOCUMENTS

CN 101714152 A 5/2010
CN 107851105 A 3/2018

(Continued)

OTHER PUBLICATIONS

International Search Report and Written Opinion dated Jun. 19, 2023, for International Application No. PCT/CN2023/088689, filed Apr. 17, 2023.

(Continued)

*Primary Examiner* — Mark E Hershley
(74) *Attorney, Agent, or Firm* — David K. Mattheis

(57) ABSTRACT

Embodiments of the present disclosure relate to a method, system, and computer program product for data management. According to the method, one or more processors divide data into a plurality of partitions. The one or more processors store the plurality of partitions in a plurality of nodes of a mixed distributed database system, wherein a first node of the mixed distributed database system comprises a plurality of databases, and wherein at least a part of the plurality of partitions are shared by the plurality of databases of the first node and being not shared by other of the plurality of nodes.

20 Claims, 10 Drawing Sheets

(56) References Cited

U.S. PATENT DOCUMENTS

| | | | | |
|---|---|---|---|---|
| 2015/0142733 | A1* | 5/2015 | Shadmon | G06F 16/21 707/769 |
| 2016/0179642 | A1* | 6/2016 | Cai | G06F 11/2033 714/4.12 |
| 2017/0006105 | A1* | 1/2017 | Shraer | H04L 67/52 |
| 2017/0103116 | A1* | 4/2017 | Hu | G06F 16/2471 |
| 2017/0235645 | A1* | 8/2017 | Theimer | G06F 21/6218 707/634 |
| 2017/0249246 | A1* | 8/2017 | Bryant | G06F 12/0261 |
| 2020/0349172 | A1* | 11/2020 | Constandache | G06F 16/275 |
| 2021/0019289 | A1* | 1/2021 | Pang | G06F 16/2477 |
| 2022/0083527 | A1* | 3/2022 | Todd | G06F 16/2282 |
| 2022/0253463 | A1* | 8/2022 | Du | G06F 16/906 |
| 2023/0169093 | A1* | 6/2023 | Whitaker | G06F 16/278 707/803 |

FOREIGN PATENT DOCUMENTS

| | | | |
|---|---|---|---|
| CN | 113395363 | A | 9/2021 |
| WO | 03003252 | A1 | 1/2003 |
| WO | 2023020233 | A1 | 2/2023 |

OTHER PUBLICATIONS

Anonymous. "Method for a mixed memory architecture." Published Oct. 24, 06 by IP.com. 4 pages. https://priorart.ip.com/IPCOM/000142175.

Kaushik, A., "What Makes Snowflake So Powerful—It's the Hybrid of Shared Disk and Shared Nothing Architecture." Published Feb. 14, 2020 by Medium. 8 pages. https://medium.com/@a.kaushik5587/what-makes-snowflake-so-powerful-its-the-hybrid-of-shared-disk-and-shared-nothing-architecture-5b4fa8f039fa.

Mell, et al., "The NIST Definition of Cloud Computing," Recommendations of the National Institute of Standards and Technology, U.S. Department of Commerce, Special Publication 800-145, Sep. 2011, 7 pgs.

Song, et al., "A Hybrid Shared-Nothing/Shared-Data Storage Architecture for Large Scale Databases." Published 2011 by IEEE. In 11th IEEE/ACM International Symposium on Cluster, Cloud and Grid Computing, pp. 616-617, doi: 10.1109/CCGrid.2011.78.

Yethadka, S., "A Distributed Lock Manager Using Paxos." Published Apr. 2013 by Uppsala University. 94 pages. http://uu.diva-portal.org/smash/record.jsf?pid=diva2%3A615805&dswid=-9798.

* cited by examiner

DATA MANAGEMENT

BACKGROUND

The present disclosure generally relates to database system and more particularly, to a method, system, and computer program product for data management.

Databases are computerized information storage and retrieval systems. A type of database is a distributed database system that can be dispersed or replicated among different points in a network. The distributed database system may be a shared-nothing architecture or a shared-disk architecture, and each architecture has its own benefits and detriments.

SUMMARY

According to one embodiment of the present disclosure, there is provided a computer-implemented method. According to the method, one or more processors divide data into a plurality of partitions. The one or more processors store the plurality of partitions in a plurality of nodes of a mixed distributed database system, wherein a first node of the mixed distributed database system comprises a plurality of databases, and wherein at least a part of the plurality of partitions are shared by the plurality of databases of the first node and being not shared by other of the plurality of nodes.

According to a further embodiment of the present disclosure, there is provided a system. The system comprises a processing unit; and a memory coupled to the processing unit and storing instructions thereon. The instructions, when executed by the processing unit, perform acts of the method according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
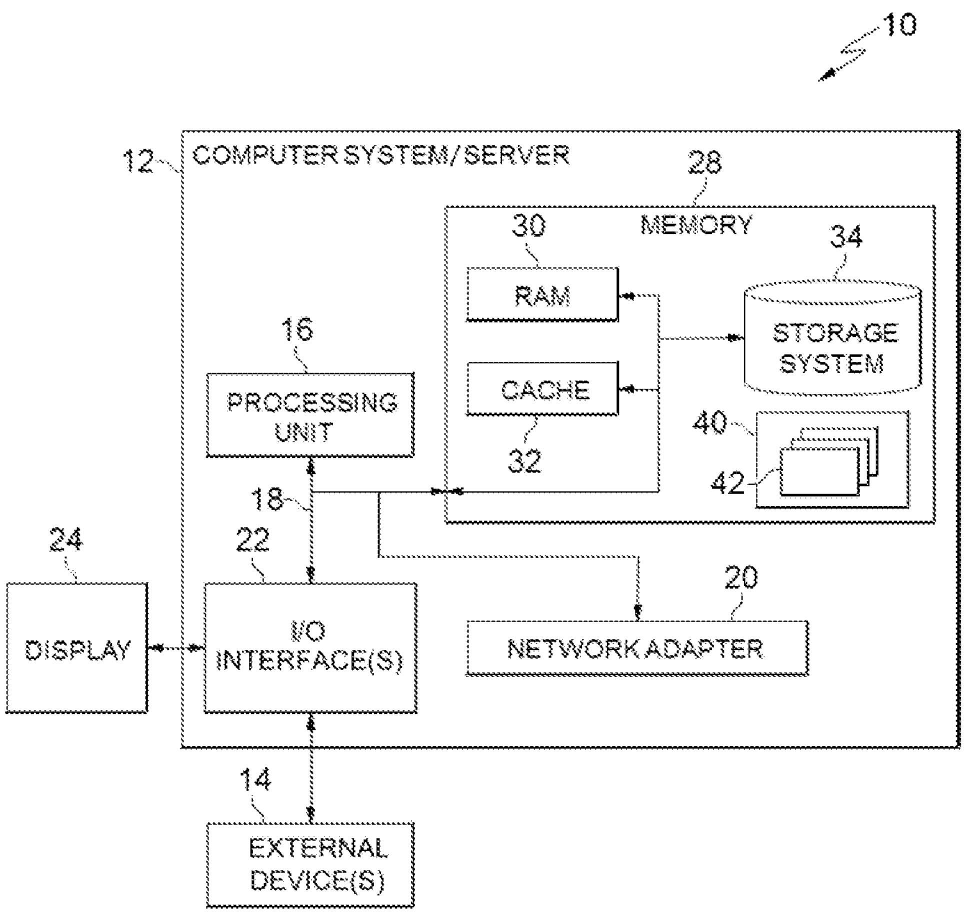
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
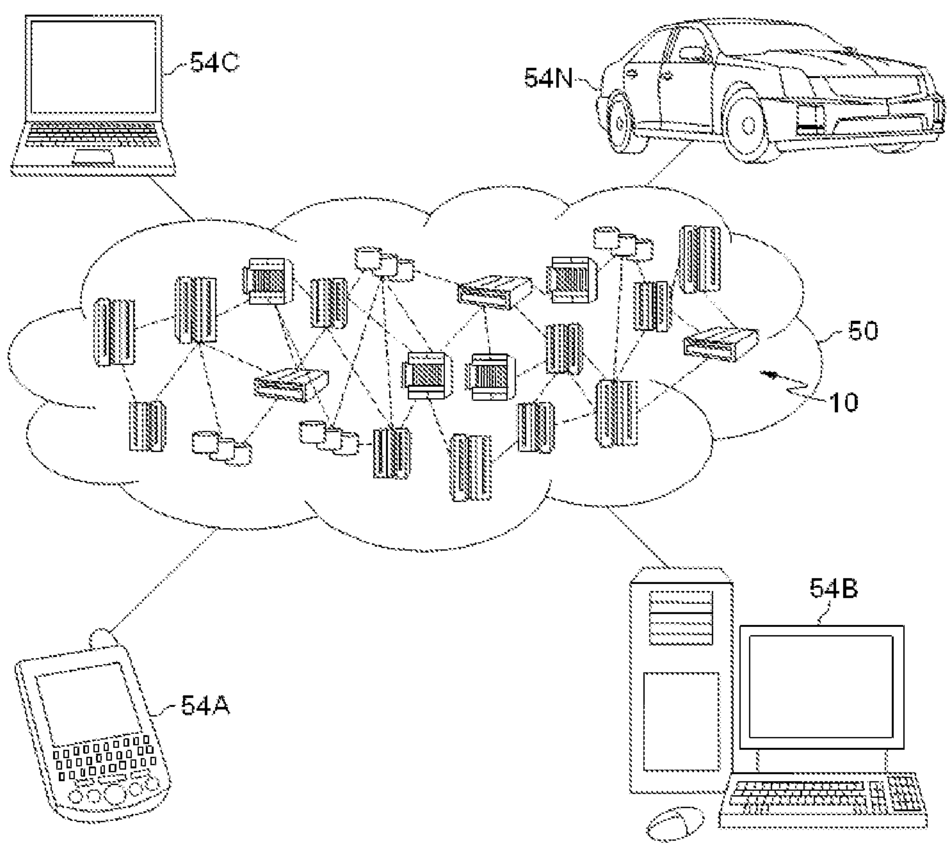
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
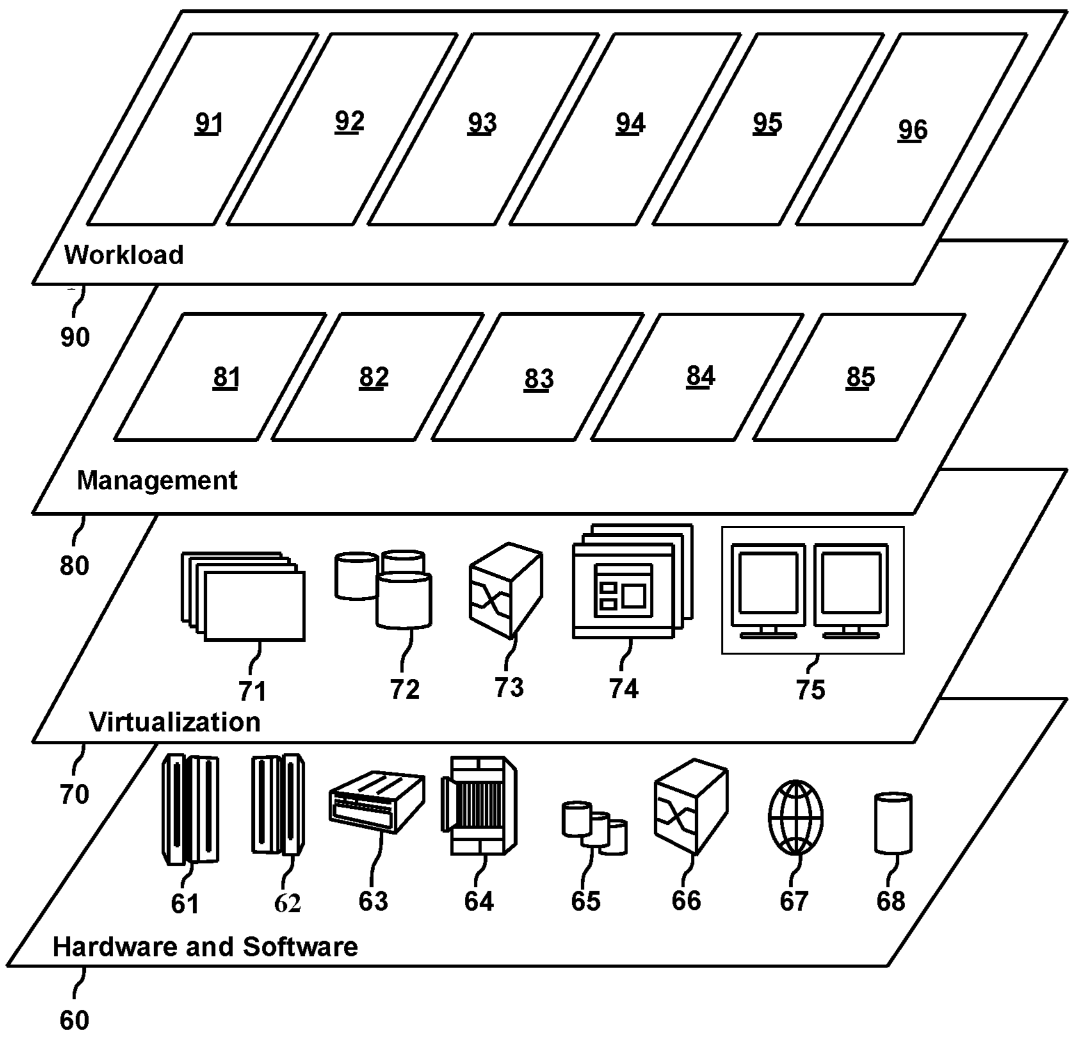
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data management 96. The functionalities of data management 96 will be described in the following embodiment of the present disclosure.

There are mainly two different architectures in distributed database system: shared-nothing architecture and shared-disk architecture. The shared-nothing architecture and the shared-disk architecture have different features, and each has its own benefits and detriments.

The shared-disk architecture is used in a distributed computing environment in which different nodes share the same disk but each node has its own memory. The disk can be accessed by any of the cluster nodes. A system with the shared-disk architecture has a dynamic load balancing, and one advantage is that it has unlimited scalability. However, the data in the shared-disk architecture is not partitioned, and thus this architecture has limited availability.

The shared-nothing architecture is used in a distributed computing environment in which each node is independent and different nodes are interconnected by a network. Every node in the shared-nothing architecture includes a processor, a main memory and a disk, and memories/disks of different nodes are not shared. A disk can be accessed only by the node the disk belongs to and cannot be accessed by other nodes. A system with the shared-nothing architecture is easily scalable and highly available. Further, the data in the shared-nothing architecture can be partitioned and summoned. However, the shared-nothing architecture has a fixed load balancing and can only expand to a limited level.

A distributed database system with the shared-nothing architecture or the shared-disk architecture each has its benefits and detriments. However, in real application environments, the data and workload are not always quite qualified on the shared-nothing architecture or the shared-disk architecture. Therefore, a more effective distributed database system may be desired.

According to example embodiments of the present disclosure, there is a proposed solution of a mixed distributed database system. In this system, a shared-nothing architecture is built on the top of the system, different nodes are non-interactive or rare interactive with each other. Under the shared-nothing architecture, a shared-disk architecture is used in a node by a cluster with multiple databases.

Other advantages of the present disclosure will be described with reference to the example embodiments and the accompanying drawings below.

Figure 4:
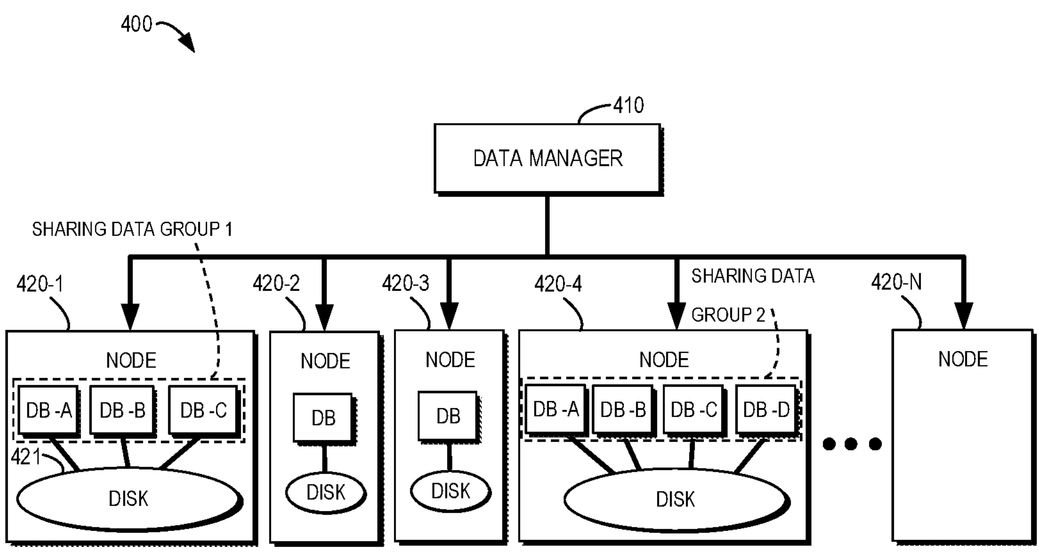
FIG. 4 depicts a block diagram of a database system according to some embodiments of the present disclosure.

Reference is first made to FIG. 4, which illustrates a block diagram of a mixed distributed database system 400 according to some embodiments of the present disclosure. In the system 400, a data manager 410 is configured to perform data management among a plurality of nodes 420-1 to 420-*n* (collectively or respectively referred to as nodes 420). Each of the nodes 420 includes one or more databases, which are used for storing partitions of data.

As shown in FIG. 4, a shared-nothing architecture is built on top of the system 400, in which each node 420 is independent and different nodes 420 are interconnected by a network. Meanwhile, a shared-disk architecture is built under the level of shared-nothing architecture with at least one node 420 comprises two or more databases sharing a disk in the node 420. Considering node 420-1 for example, there are three databases (i.e., DB-A, DB-B, and DB-C) sharing the same disk 421.

In some embodiments of the present disclosure, two or more databases in the same node may be referred as a sharing data group, and the node with two or more databases may be referred as a sharing group node. For example, the databases (DB-A, DB-B, and DB-C) in node 420-1 may be referred as a sharing data group 1, and the databases (DB-A, DB-B, DB-C, and DB-D) in node 420-4 may be referred as a sharing data group 2.

It would be appreciated that the number of databases in one node shown in FIG. 4 is provided as an example, and a sharing group node may include other numbers of databases.

It would be understood that there is no need that every node 420 in the system 400 has a sharing data group. In other words, a node with only one database may exist in the system 400. For example, node 420-2 in FIG. 4 includes only one database (DB), which does not belong to any sharing data group. In some embodiments of the present disclosure, a node with only one database may be referred as a single node in the system 400.

In some embodiments, each node in the system 400 may be set with a weight, and in some embodiments, a sharing data node can have a higher weight than a single node. For example, the weight of node 420-1 may be greater than that of node 420-2.

It is noted that the number of nodes in the system 400 can be scalable. In some embodiments, one or more new nodes can be added in the system, in this event, the number of nodes in the level of shared-nothing architecture can be increased so that the capacity of the system can be improved. Further, the number of the databases in one node also can be changed. In some embodiments, one or more databases can be added to a specific node. In this event, the number of databases in one node can be increased so that the performance for the node may be improved. Therefore, the mixed distributed database system in the present disclosure not only has a highly scalability on system level but also has a highly scalability on node level.

In some embodiments of the present disclosure, the data manager 410 may be implemented by computer system/server 12 of FIG. 1 or by multiple computer systems/servers in a distributed manner. In some embodiments of the present disclosure, the data manager 410 may be implemented as a software module to implement data management.

Figure 5A:
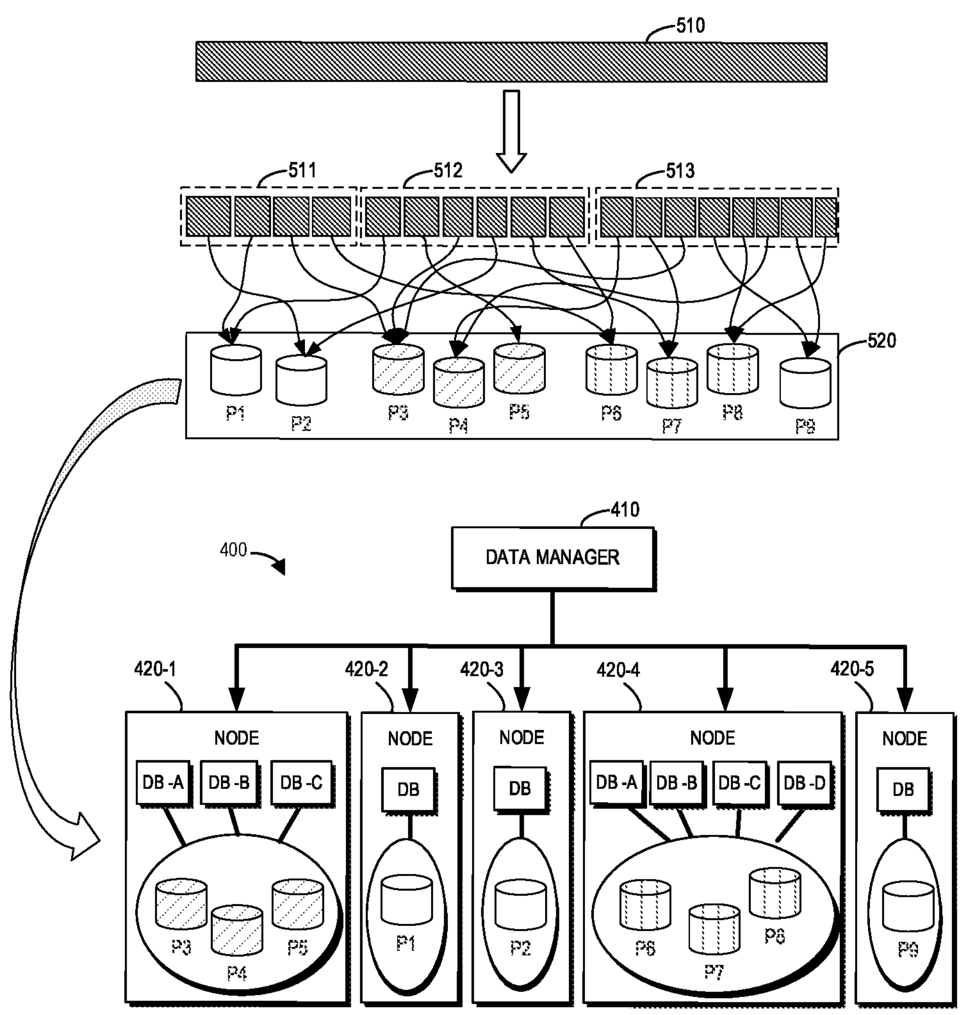
FIGS. 5A-5D depict an example environment in which some embodiments of the present disclosure are implemented.

Example operations for data management according to some embodiments of the present disclosure are illustrated by referring to FIGS. 5A to 5D. For the purpose of illustration, the system in FIG. 5A is a simplified version of the one in FIG. 4, and further reference will be made to FIGS. 5B, 5C, and 5D to illustrate further example operations of data management.

To better illustrate the embodiments of the present disclosure, as shown in FIG. 5A, the system comprises five nodes in total (i.e., node 420-1, node 420-2, node 420-3, node 420-4 and node 420-5). To better illustrate the embodiments of the present disclosure, as shown in FIG. 5A, node 420-1 is a sharing group node and includes three databases, node 420-4 is also a sharing group node and includes four databases, and each of node 420-2, node 420-3 and node 420-5 is a single node and includes one database respectively. It is understood that the number of the nodes, the number of databases in each node in FIG. 5A is only an example and should not be deemed as a limitation of the present disclosure.

In particular, the data manager 410 can divide data into partitions and store the partitions of data in the system. Referring to FIG. 5A, data 510 can be divided into a plurality of partitions 520. In some embodiments, the data 510 may be grouped into different logical groups, such as a logical group 511, a logical group 512 and a logical group 513 as shown in FIG. 5A, and each logical group may include one or more data segments. Then the data segments may be re-arranged into a plurality of partitions 520, such as P1 to P9 shown in FIG. 5A. In some embodiments of the present disclosure, the division of data may be based on one or more of the following factors: data range, time, location, etc. It is noted that any known technical may be used for dividing the data 510, for example, Hash operations may be used for generating the partitions 520.

The partitions of data may be further stored into the distributed database system 400. In some embodiments of the present disclosure, some partitions of data which are associated with each other may be stored into a same node. Referring to FIG. 5A, P3, P4, and P5 are closely interactive and thus can be stored into the same node (i.e., node 420-1). Similarly, P6, P7 and P8 are closely interactive and thus can be stored into node 420-4. In this regard, the transaction performance can be improved.

Figure 5B:
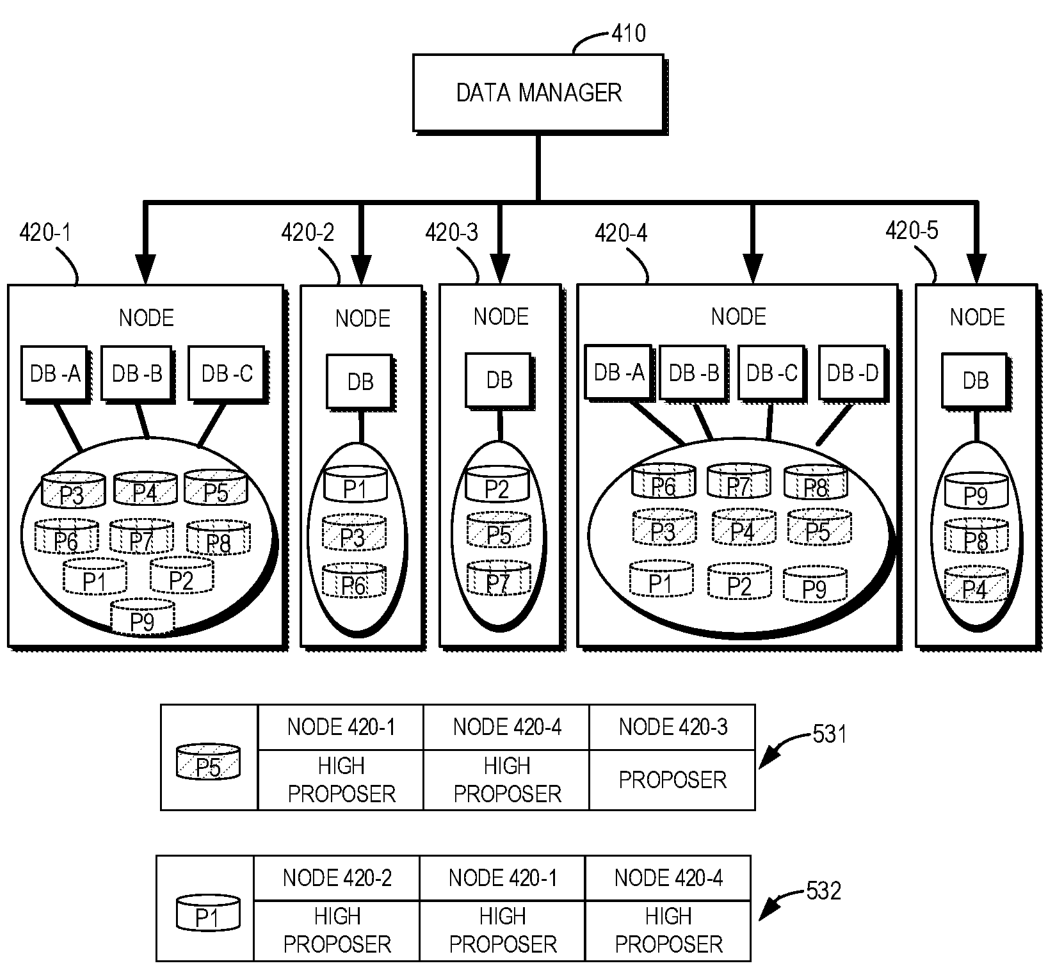

Additionally, for each partition in one node, there may be one or more copies in other node(s). Referring to FIG. 5B, a copy of P5 is stored in node 420-4 and another copy of P5 is stored in node 420-3, and a copy of P1 is stored in node 420-1 and another copy of P1 is stored in node 420-4. Similarly, P2, P3, P4, P6, P7, P8 and P9 each can be copied, and every copy may be stored in a node.

In some embodiments, copies of some related partitions, such as P3, P4 and P5, may be stored in a same node (e.g., node 420-4) or may be stored in different nodes (e.g., node 420-2, node 420-5 and node 420-3) respectively. In this regard, a single node can be chosen to store a copy of a partition in a sharing data group.

In some embodiments, a copy of a partition in a single node, such P1, may be stored in a sharing data node (node 420-1 or node 420-4). In this regard, a partition in a single node can be stored in a sharing data node. In some embodiments, a copy of a partition in a single node may also be stored in another single node.

In this way, a partition of data may be stored into several different nodes, and one of these nodes is a leader node for the partition of data. Referring to FIG. 5B, node 420-1 is a leader node for P3, P4 and P5, node 420-2 is a leader node for P1, node 420-3 is a leader node for P2, node 420-4 is a leader node for P6, P7 and P8, and node 420-5 is a leader node for P9 (as indicated by the solid lines of these partitions when compared to the phantom lines of the other partitions in the node).

Further, each node storing a specific partition can have a role for the specific partition. In some embodiments, the role may be defined based on paxos consensus algorithm, for example, the method used in the present disclosure may be referred as "Paxos-Plus".

In some embodiments, the role may be "high proposer" or "proposer", and it would be appreciated that the role may be transferred to "accepter" or "leaner", which will be discussed below in the present disclosure.

It would be appreciated that different nodes may be set to be in the same role or be different roles for a specific partition. In some embodiments, a node with a high weight may be configured with a role of high proposer.

Considering P5, for example, node 420-1 has a role of high proposer, node 420-4 has a role of high proposer, and node 420-3 has a role of proposer, shown as in table 531 in FIG. 5B. Considering P1, for example, node 420-1, node 420-2, and node 420-4 each has a role of high proposer, shown as in table 532 in FIG. 5B.

It can be understood that different roles of nodes for P5 and P1 are shown in FIG. 5B as example, and the roles of nodes for other partitions can be similarly defined and will not be described in detail in the present disclosure.

In some scenarios, one or more nodes may fail in the system, and a new leader node for those partitions storing in the failed one or more nodes can be determined. In some embodiments of the present disclosure, a paxos-plus method is proposed to choose a new leader node.

Figure 5C:
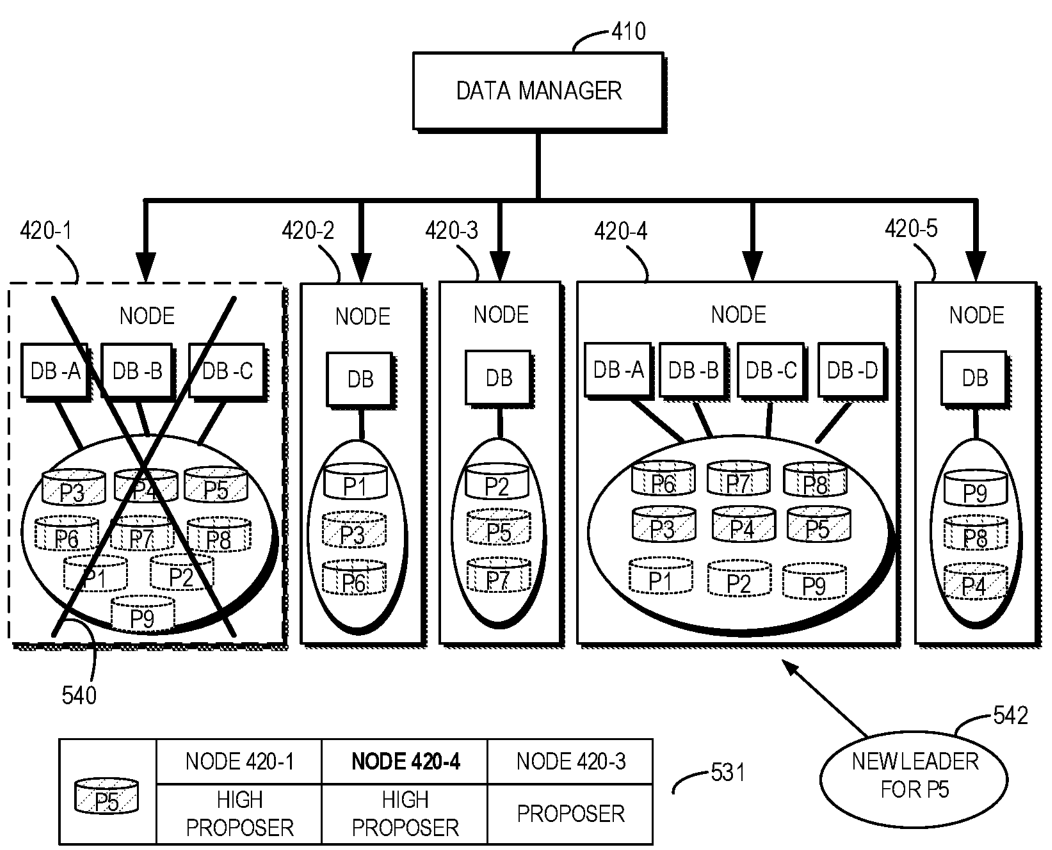
Figure 5D:
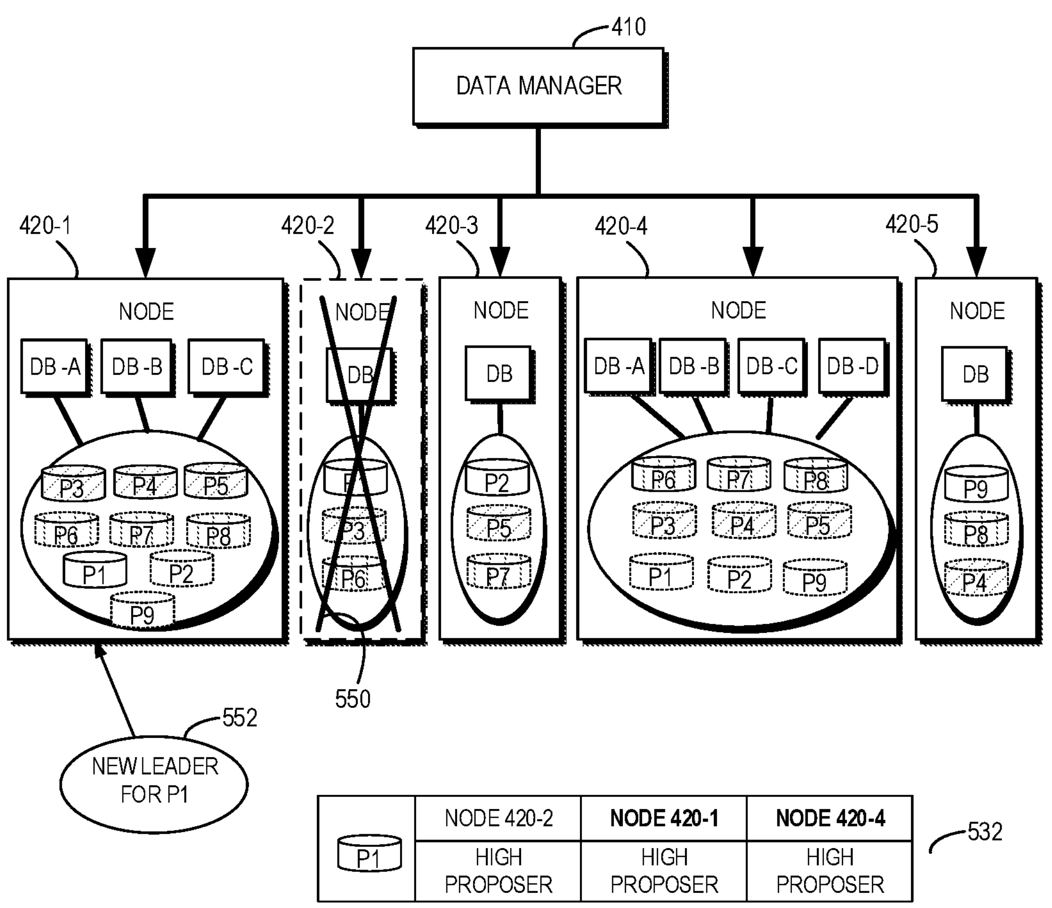
Figure 6:
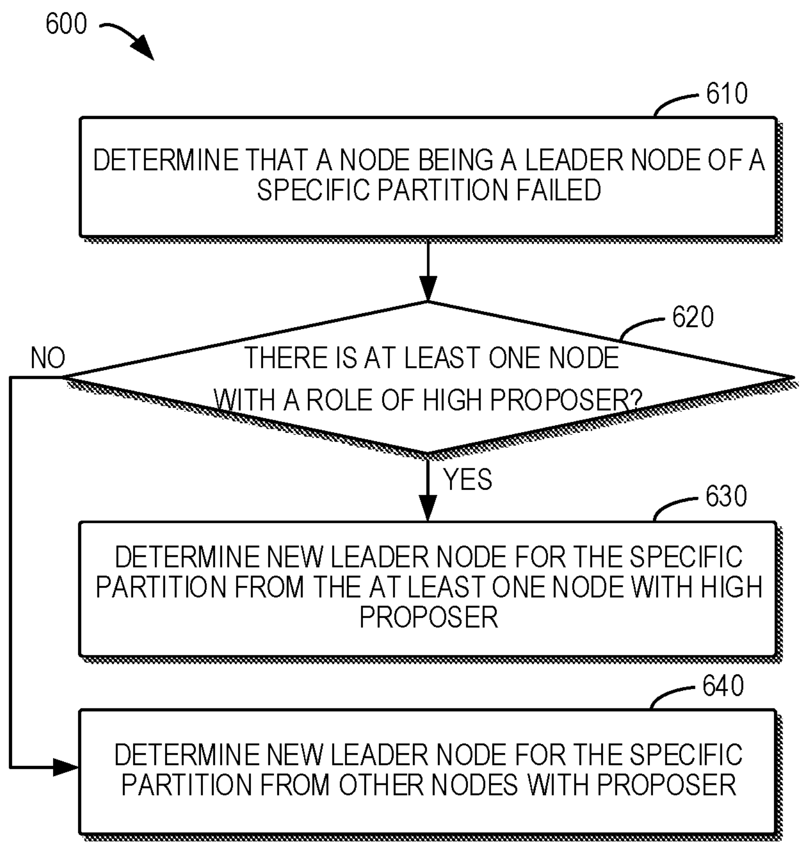
FIG. 6 depicts a flowchart of an example process according to some embodiments of the present disclosure.

FIG. 6 depicts a flowchart of an example method 600 according to some embodiments of the present disclosure. The method 600 can be implemented at the data manager 410 of FIG. 4. For the purpose of discussion, the method 600 will be described from the perspective of the data manager 410 with reference to FIGS. 5C-5D.

At block 610, the data manager 410 determines that a node being a leader node of a specific partition has failed. At block 620, the data manager 410 determines whether there is at least one node with a role of high proposer for the specific node. If there is at least one node with a role of high proposer for the specific node, the data manager 410 may determine which node of the at least one node with the role of high proposer is the new leader node of the specific partition at block 630. If there is no node with a role of high proposer for the specific node, the data manager 410 may determine a node of the other node(s) with a role of proposer as a new leader node of the specific partition at block 640.

In some embodiments, according to the paxos-plus method, the node with a role of high proposer may be determined as the new leader node of the specific partition if there is only one active node with high proposer, or in other cases, one node may be voted as the new leader node of the specific partition from all those nodes with high proposer.

As discussed above, node 420-1 is the leader node for P3, P4 and P5. When the node 420-1 failed, a new leader node should be determined for P3, P4 and P5. Referring to FIG. 5C, considering P5 for example, since node 420-1 and node 420-4 each has a role of high proposer and node 420-1 failed 540, node 420-4 will be chosen as the new leader node 542 for P5. In other words, it can be determined that copies of P5 are stored in node 420-4 and node 420-3 for backup, the role of node 420-4 is high proposer, and the role of node 420-3 is proposer for P5 as shown in table 531. Thus node 420-4 is chosen as the new leader node 542 for P5, and node 420-3 is still storing a copy of P5 with a role of proposer. The similar process can be applied to P3 and P4, in this event, node 420-4 will be the new leader node for P3, P4 and P5.

As discussed above, node 420-2 is the leader node for P1. When the node 420-2 has failed, a new leader node should be determined for P1. Referring to FIG. 5D, since node 420-1, node 420-2 and node 420-4 each has a role of high proposer and node 420-2 failed 550, then node 420-1 and node 420-4 can be voted on to choose a new leader node for P1. For example, it is assumed that node 421-1 is voted as the new leader node 552 successfully. In other words, it can be determined that copies of P1 are stored in node 420-1 and node 420-4, both with a role of high proposer as shown in table 532, thus a voting process will be performed to choose a node as the new leader node for P1. In case that node 420-1 is voted as the new leader node 552 of P1, then node 420-4 may still be storing the copy of P1 with a role of high proposer.

Therefore, in case a leader node failed, another node with a role of high proposer will be chosen as a new leader node for the partition(s).

It can be appreciated that a node with a role of proposer may be chosen as the new leader node in case that there is no node with a role of high proposer available. For example, in the situation shown in FIG. 5C, if both nodes 420-1 and 420-4 failed, then node 420-3 will be the new leader node for P5 since there is no node with a role of high proposer is available. In other words, only when there is no node with a role of high proposer, a node with a role of proposer can be selected as a leader node for partitions.

Through the new-leader-node-selecting process discussed above, the roles of nodes are considered, and a node with a role of high proposer can be determined as the new leader node. Therefore, there is no need for voting among all nodes with copies, the processing time can be reduced, and the system performance can be improved. Additionally, by defining the role of nodes for partitions, different partitions related with each other can be stored in the same node, which makes the data accessing more efficient.

Figure 7:
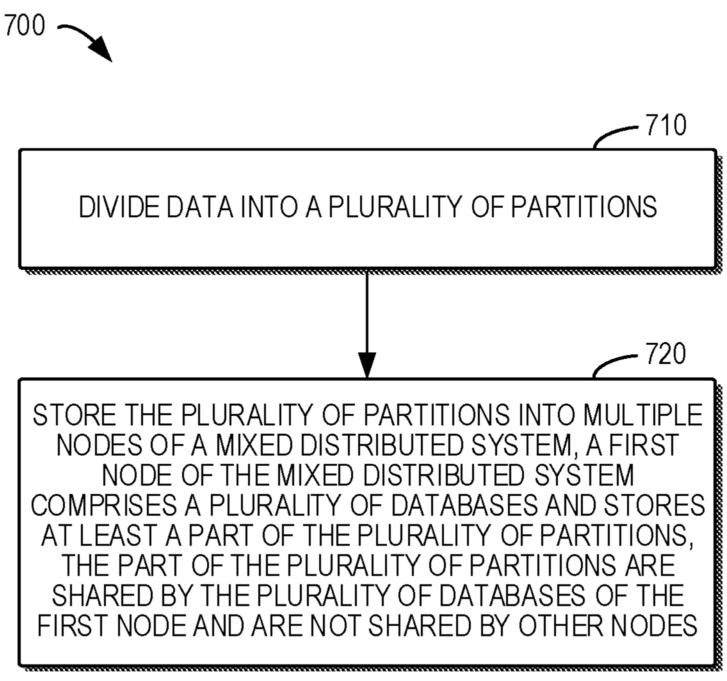
FIG. 7 depicts a flowchart of an example process according to some embodiments of the present disclosure.

FIG. 7 depicts a flowchart of an example method 700 according to some embodiments of the present disclosure. The method 700 can be implemented at the data manager 410 of FIG. 4. For the purpose of discussion, the method 700 will be described from the perspective of the data manager 410 with reference to FIGS. 5A-5D.

At block 710, the data manager 410 divides data into a plurality of partitions. At block 720, the data manager 410 stores the plurality of partitions into multiple nodes of a mixed distributed database system, a first node of the mixed distributed database system comprising a plurality of databases and storing at least a part of the plurality of partitions, the part of the plurality of partitions being shared by the plurality of databases of the first node and being not shared by other nodes.

In some embodiments, the data manager 410 sets a role of the first node as high proposer for the part of the plurality of partitions, the first node being a leader node of the part of the plurality of partitions.

In some embodiments, the data manager 410 stores a first copy of a first partition of the part of the plurality of partitions in a second node and sets a role of the second node as high proposer for the first partition.

In some embodiments, the second node comprises a plurality of databases.

In some embodiments, the data manager 410 stores a second copy of the first partition of the part of the plurality of partitions in a third node and sets a role of the third node as high proposer or proposer for the first partition.

In some embodiments, the third node comprises only one database.

In some embodiments, the data manager 410 determines that the first node failed; and in accordance with a determination that the second node has a role of high proposer for the first partition, determines the second node as the new leader node of the first partition.

In some embodiments, the role of the third node is high proposer for the first partition. The data manager 410 determines that the first node failed; and votes a new leader node for the first partition from the second node and third node.

In some embodiments, the data manager 410 adds a new database into the first node sharing the part of the plurality of partitions.

In some embodiments, the data manager 410 adds a new node into the mixed distributed database system.

It should be noted that the data manager 410 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

dividing, by one or more processors, data into a plurality of partitions; and storing, by the one or more processors, the plurality of partitions in a plurality of nodes on a plurality of disks of a mixed distributed database system;

wherein each of the plurality of nodes includes one of the plurality of disks;

wherein a first node of the mixed distributed database system comprises a first plurality of databases;

wherein at least a subset of the plurality of partitions are shared on a first disk by the first plurality of databases of the first node and being not shared by other of the plurality of nodes; and wherein the partitions of the at least a subset of the plurality of partitions are associated with each other and are stored on the first node.

2. The method of claim 1, further comprising:

setting, by the one or more processors, a role of the first node as high proposer for the subset of the plurality of partitions, wherein the first node is a leader node of the subset of the plurality of partitions.

3. The method of claim 1, wherein:

the storing further comprises:

storing, by the one or more processors, a first partition of the subset of the plurality of partitions in the first node; and storing, by the one or more processors, a first copy of the first partition of the subset of the plurality of partitions in a second node; and the method further comprises setting, by the one or more processors, a role of the second node as high proposer for the first partition.

4. The method of claim 3, wherein the second node comprises a second plurality of databases sharing a second disk.

5. The method of claim 3, further comprising:

storing, by the one or more processors, a second copy of the first partition of the subset of the plurality of partitions in a third node; and setting, by the one or more processors, a role of the third node as high proposer for the first partition.

6. The method of claim 5, wherein the third node comprises only one database on a third disk.

7. The method of claim 5, wherein the method further comprises:

determining, by the one or more processors, that the first node has failed; and voting, by the one of more processors, for a new leader node for the first partition from the second node and third node.

8. The method of claim 3, further comprising:

determining, by the one or more processors, that the first node has failed; and determining, by the one or more processors, the second node as the new leader node of the first partition based on the second node having the role of high proposer for the first partition.

9. The method of claim 1, further comprising:

adding, by the one or more processors, a new database into the first node sharing the subset of the plurality of partitions.

10. The method of claim 1, further comprising:

adding, by the one or more processors, a new node into the mixed distributed database system.

11. A system comprising:

a processing unit; and a memory coupled to the processing unit and storing instructions thereon, the instructions, when executed by the processing unit, performing acts comprising:

dividing data into a plurality of partitions; and storing the plurality of partitions in a plurality of nodes on a plurality of disks of a mixed distributed database system;

wherein each of the plurality of nodes includes one of the plurality of disks;

wherein a first node of the mixed distributed database system comprises a plurality of databases;

wherein at least a subset of the plurality of partitions are shared on a first disk by the plurality of databases of the first node and being not shared by other of the plurality of nodes; and wherein the partitions of the at least a subset of the plurality of partitions are associated with each other and are stored on the first node.

12. The system of claim 11, wherein the memory stores additional instructions thereon, the additional instructions, when executed by the processing unit, performing additional acts that further comprise:

setting a role of the first node as high proposer for the subset of the plurality of partitions, wherein the first node is a leader node of the subset of the plurality of partitions.

13. The system of claim 11, wherein:

the act of storing further comprises:

storing a first partition of the subset of the plurality of partitions in the first node; and storing a first copy of the first partition of the subset of the plurality of partitions in a second node; and the memory stores additional instructions thereon, the additional instructions, when executed by the processing unit, performing additional acts that further comprise setting a role of the second node as high proposer for the first partition.

14. The system of claim 13, wherein the memory stores additional instructions thereon, the additional instructions, when executed by the processing unit, performing additional acts that further comprise:

storing a second copy of the first partition of the subset of the plurality of partitions in a third node; and setting a role of the third node as high proposer or proposer for the first partition.

15. The system of claim 14, wherein the role of the third node is high proposer for the first partition, and wherein the memory stores additional instructions thereon, the additional instructions, when executed by the processing unit, performing additional acts that further comprise:

determining that the first node has failed; and voting for a new leader node for the first partition from the second node and third node.

16. The system of claim 13, wherein the memory stores additional instructions thereon, the additional instructions, when executed by the processing unit, performing additional acts that further comprise:

determining that the first node has failed; and determining, by the one or more processors, the second node as the new leader node of the first partition based on the second node having the role of high proposer for the first partition.

17. A computer program product being tangibly stored on a non-transient machine-readable medium and comprising machine-executable instructions, the instructions, when executed on a device, causing the device to perform acts comprising:

dividing data into a plurality of partitions; and storing the plurality of partitions in a plurality of nodes on a plurality of disks of a mixed distributed database system;

wherein each of the plurality of nodes includes one of the plurality of disks;

wherein a first node of the mixed distributed database system comprises a plurality of databases;

wherein at least a subset of the plurality of partitions are shared on a first disk by the plurality of databases of the first node and being not shared by other of the plurality of nodes; and wherein the partitions of the at least a subset of the plurality of partitions are associated with each other and are stored on the first node.

18. The computer program product of claim 17, wherein the non-transient machine-readable medium comprises additional instructions thereon, the additional instructions, when executed by the device, performing additional acts that further comprise:

setting a role of the first node as high proposer for the subset of the plurality of partitions, the first node being a leader node of the subset of the plurality of partitions.

19. The computer program product of claim 18, wherein:

the act of storing further comprises:

storing a first partition of the subset of the plurality of partitions in the first node; and storing a first copy of the first partition of the subset of the plurality of partitions in a second node; and the non-transient machine-readable medium comprises additional instructions thereon, the additional instructions, when executed by the device, performing additional acts that further comprise setting a role of the second node as high proposer for the first partition.

20. The computer program product of claim 19, wherein the non-transient machine-readable medium comprises additional instructions thereon, the additional instructions, when executed by the device, performing additional acts that further comprise:

determining that the first node failed; and determining the second node as the new leader node of the first partition based on the second node having the role of high proposer for the first partition.

* * * * *